United States Patent [19]
Yamamoto et al.

[11] Patent Number: 6,089,739
[45] Date of Patent: Jul. 18, 2000

[54] SURFACE LIGHT SOURCE DEVICE

[75] Inventors: Koichi Yamamoto; Dai Yoneya, both of Tokyo; Takayoshi Omori, Kanagawa; Akihiro Suzuki, Miyagi, all of Japan

[73] Assignee: Sony Corporation, Tokyo, Japan

[21] Appl. No.: 09/206,098

[22] Filed: Dec. 4, 1998

Related U.S. Application Data

[62] Division of application No. 08/940,978, Sep. 30, 1997, Pat. No. 5,993,027.

[51] Int. Cl.$^7$ .................................................. G02F 1/1335
[52] U.S. Cl. .............................. 362/561; 362/30; 362/29
[58] Field of Search .................. 362/97, 29, 30, 362/561

[56] References Cited

U.S. PATENT DOCUMENTS

| | | | |
|---|---|---|---|
| 5,070,431 | 12/1991 | Kitazawa et al. | 362/30 X |
| 5,486,983 | 1/1996 | Cordier et al. | 362/29 |
| 5,659,376 | 8/1997 | Uehara et al. | 362/30 X |
| 5,664,873 | 9/1997 | Kanda et al. | 362/97 |
| 5,666,172 | 9/1997 | Ida et al. | 362/29 X |
| 5,779,339 | 7/1998 | Konishi et al. | 362/30 X |

*Primary Examiner*—Laura K. Tso
*Attorney, Agent, or Firm*—Hill & Simpson

[57] ABSTRACT

As regards a surface light source device for use with back-light or the like of a transmissive display panel, the efficiency of the cooling structure for the device will be improved and dust and dirt will be prevented from adhering. The surface-light source device has a housing, a diffuser panel, a reflective plate, lamps, and an electric circuit portion. The housing has a window portion located ahead, a base portion located behind and side portions forming a flat space by connecting the two. The diffuser panel is mounted to the window portion of the housing. The reflective plate is supported by the side portions and partitions the flat space into a closed space ahead and an open space behind to be interposed therebetween. The lamps are housed in the closed space, and are positioned right above the reflective plate and right under the diffuser panel to radiate light toward the diffuser panel. The electric circuit portion is housed in the open space, and is electrically connected to the lamps to light them up. On the side portions of the housing, there are formed openings, through which cooling air supplied from outside is introduced into the open space to diffuse heat accumulated within the housing.

2 Claims, 4 Drawing Sheets

SURFACE LIGHT SOURCE DEVICE

This application is a Division of Ser. No. 08/940,978 filed Sep. 30, 1997, now U.S. Pat. No. 5,993,027.

BACKGROUND OF THE INVENTION

1. Field of the Invention

The present invention relates to a surface light source device for use with a back-light or the like for back-lighting a transmissive display panel, and more particularly to an air-cooled structure for a surface light source device containing lamps for allowing for heat conduction.

2. Description of Related Art

A display panel, using liquid crystal or the like as an electro-optical substance in a large-sized flat display to replace CRT's, has been under development in recent years.

The display panel is not a spontaneous light emission type, but modulates external light to display a screen. The display panel can be roughly divided into transmission types and reflection types. In the case of the transmission type, a surface light source device is arranged on the back of the display panel for back-lighting.

A surface light source device used as a back-light for A large-sized display panel contains lamps consisting of a large number of fluorescent tubes or the like to generate a large amount of heat. This heat raises the temperature of the display panel to change the electro-optical characteristics of the liquid crystal used as electro-optical substance, thus deteriorating the image quality. Also, the atmospheric temperature within the back-light rises to decrease the luminous efficiency of the fluorescent tubes, causing deteriorated brightness. For this reason, forced cooling using air-cooling fans or like becomes indispensable in a large-sized back-light. If, however, an air-cooling fan is used, dust is whirled up to adhere to the surface of lamps or to a diffuser panel disposed thereon, thus deteriorating the uniformity of brightness of the surface light source device.

If dust stuck on the lamps and the diffuser panel is visually recognized by an observer through a transmissive display panel, the image quality will be noticeably deteriorated.

SUMMARY OF THE INVENTION

In order to solve the problem of the prior art described above, the following measures were taken. That is, a surface light source device according to the present invention has, as its basic structure, a housing, a diffuser panel, a reflective plate, lamps, an electric circuit portion, and a heat-radiating portion. The housing has a window portion located ahead, a base portion located behind and side portions forming a flat space by connecting the two. The diffuser panel is mounted to the window portion. The reflective plate is supported by the side portions and partitions the flat space into a closed space ahead and an open space behind to be interposed therebetween. The lamps are housed in the closed space, and are positioned right above the reflective plate and right under the diffuser panel to radiate light toward the diffuser panel. The electric circuit portion is housed in the open space, and is electrically connected to the lamps to light them up. As the special feature, the heat-radiating portions are formed on the side portions of the housing, include a plurality of openings for conductively connecting to the open space, and introduce cooling air supplied from outside into the open space to diffuse heat accumulated within the housing.

Preferably, the reflective plate consists of an aluminum plate, on the surface of which heat-resistant white coating has been applied, and transmits the heat from the lamps generated on the front closed space side to the rear open space side to improve the cooling effect. Also, preferably, the reflective plate has a corrugated cross-section to reduce the resistance of cooling air flowing along its back surface to increase the cooling effect. Further preferably, the reflective plate is one sheet of metal plate subjected to folding twice or more, or one obtained by joining together metal pieces divided into two or more parts, and sticking heat-conductive metal webs along the joints to eliminate any temperature differences between each metal piece. In addition, preferably, the lamps have a longitudinal shape having electrode portions at both ends thereof.

Protective members having heat conductivity and heat resistance are mounted to the electrode portions respectively in such a manner that the heat generated in the electrode portions is diffused outside of the closed space through the protective members.

In the air-cooled structure according to the present invention, a closed space (lamp house) is constituted between a diffuser panel and a reflective plate which are installed in a housing, and lamps are housed therein. Also, an open space is formed between the reflective plate and the base portion of the housing, and cooling air is forcibly fed there by an air-cooling fan or the like. Since the lamp house is closed up tight, there is no possibility that dust and dirt carried by cooling air enter can. Since the cooling air is blown along the back surface of the reflective plate, the air-cooling efficiency is high.

DETAILED DESCRIPTION OF THE PREFERRED EMBODIMENT

Figure 1:
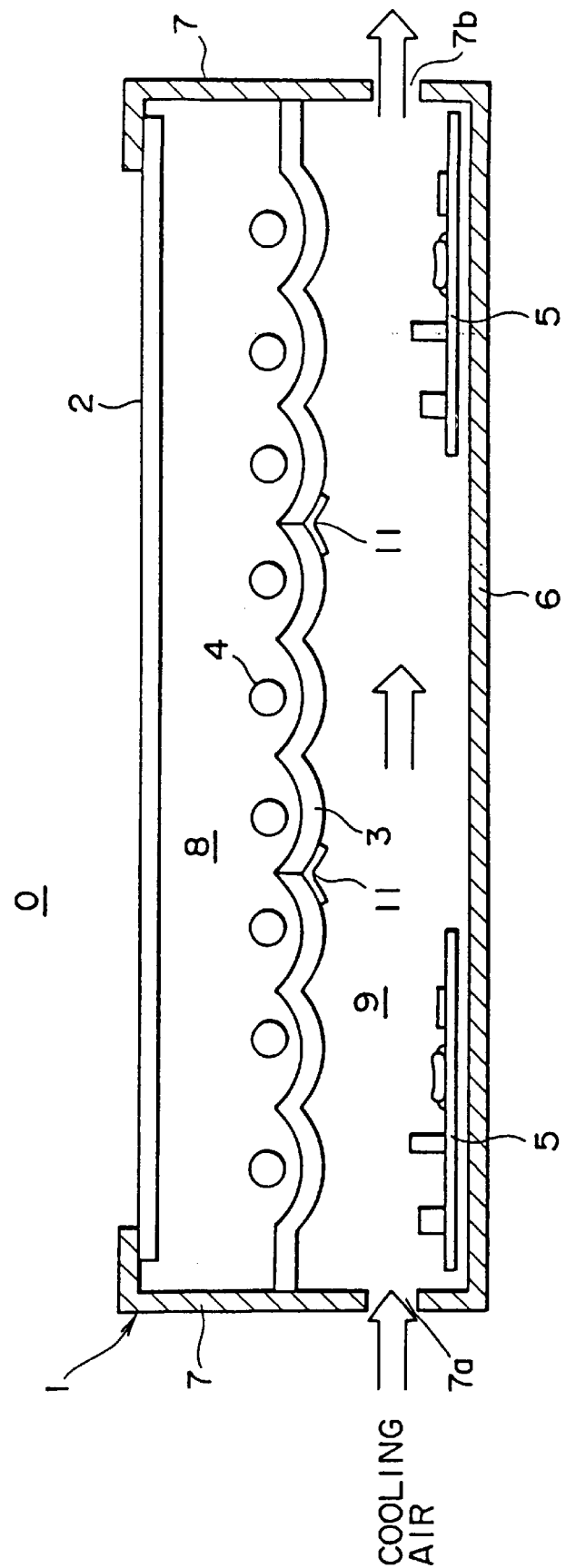
FIG. 1 is a sectional view showing an embodiment of a surface light source device according to the present invention.

Hereinafter, the detailed description will be made of the best embodiment according to the present invention with reference to the drawings. FIG. 1 is a schematic, sectional view showing an embodiment of a surface light source device according to the present invention. As shown in the figure, a surface light source device 0 has a housing 1, a diffuser panel 2, a reflective plate 3, lamps 4, an electric circuit portion 5 and a heat-radiating portion. The housing 1 has a window portion located ahead, a base portion 6 located behind and side portions 7 forming a flat space by connecting together the two. The diffuser panel 2 is mounted to the window portion of the housing 1. For this diffuser panel 2, obscure glass or the like can be used, or one obtained by forming material, in which finely divided particles having light diffusion properties are dispersed in transparent resin such as acrylic, into a plate shape may be used. The reflective plate 3 is supported by the side portions 7 for facing each other within the housing 1 and partitions the flat space into a closed space (lamp house) 8 ahead and an open space 9 behind so as to be interposed therebetween. The lamps 4 consist of fluorescent tubes or the like, and are housed in the closed space 8. A plurality of lamps 4 are arranged at a fixed pitch, and positioned right above the reflective plate 3 and right under the diffuser panel 2 to radiate light toward the diffuser panel 2. The light: from the lamps 4 as a light source is diffused by the diffuser panel 2, and thereafter is emitted outward as luminous light having uniform brightness distribution. Thus, the surface light source device 0 having uniform brightness distribution can be obtained. The electric circuit portion 5 is housed in the open space 9, and is electrically connected to the lamps 4 to light them up. If fluorescent tubes or the like are used for the lamps 4, an inverter or the like is included in the electric circuit portion 5.

As the special feature of the present invention, the heat-radiating portions are formed in the side portions 7 of the housing 1, include a plurality of openings 7a and 7b for conductively connecting to the open space 9, and introduce cooling air supplied from outside by an air-cooling fan or the like into the open space 9 to diffuse heat accumulated within the housing 1. In the example shown, the cooling air introduced from the one opening 7a moves within the open space 9 along the back surface of the reflective plate 3, and is fed out through the other opening 7b.

As described above, in the present embodiment, a closed space (lamp house) 8 is formed between a diffuser panel 2 and a reflective plate 3 which are installed in the housing 1, and lamps 4 are housed therein. Accordingly, there is no possibility that dust and dirt fed in together with the cooling air enter the closed space 8, making it possible to prevent dust and dirt from adhering. On the other hand, an open space 9 is formed between the reflective plate 3 and the base portion 6 of the housing 1, and cooling air is forcibly fed there by an external air-cooling fan or the like. Since the cooling air moves along the back surface of the reflective plate 3, it becomes possible to diffuse the heat generated from the lamps 4 outward very efficiently. In addition, the cooling air is capable of cooling also the electric circuit portion 5 mounted on the base portion 6 of the housing 1.

Preferably, the reflective plate 3 consists of an aluminum plate, on the surface of which heat-resistant white coating has been applied, and transmits the heat from the lamps generated on the front closed space 8 side to the rear open space 9 side to improve the cooling effect. Also, preferably, the reflective plate 3 has a corrugated cross-section convex toward below to reduce the resistance of cooling air flowing along its back surface for increasing the cooling efficiency. In this respect, in the present embodiment, the reflective plate 3 is obtained by joining together metal pieces divided into two or more parts, and sticking heat-conductive metal webs 11 along the joints, or one sheet of metal plate may be folded. In a surface light source device corresponding to a display panel having a large screen, the area itself of the reflective plate 3 also becomes rather large. In such a case, it requires engineering skill of a high order and is not so good in the manufacturing efficiency to form one sheet of reflective plate 3 into a corrugate shape. Therefore, as in the present embodiment, it is practical to join together metal pieces divided in advance for working into a reflective plate 3. In this respect, the present invention is not restricted to this, but the reflective plate 3 may be formed as solid structure in a small-sized surface light source device. In the case of the reflective plate 3 divided, heat:-conductive metal webs (for example, copper foil) 11 are so stuck along the joints as not to intercept the heat transfer at the joints. By so doing, the temperature distribution is made uniform over the entire surface of the reflective plate 3. The lamps 4 such as fluorescent tubes have temperature-dependent properties in the light emission intensity and the life. Therefore, in order to obtain uniform brightness distribution in the surface light source device 0, it is necessary to make the temperature distribution uniform over the entire closed space 8. To this end, it is necessary to enhance the thermal conductivity of the reflective plate 3 in the surface direction, and in the case of the divided reflective plate, the heat-conductive metal webs 11 stuck along the joints act effectively. Also, in order to make the lives of the individual lamps 4 even, it is preferable to enhance the heatconductivity of the reflective plate 3 and to make the temperature distribution in the closed space 8 uniform.

Figure 2:
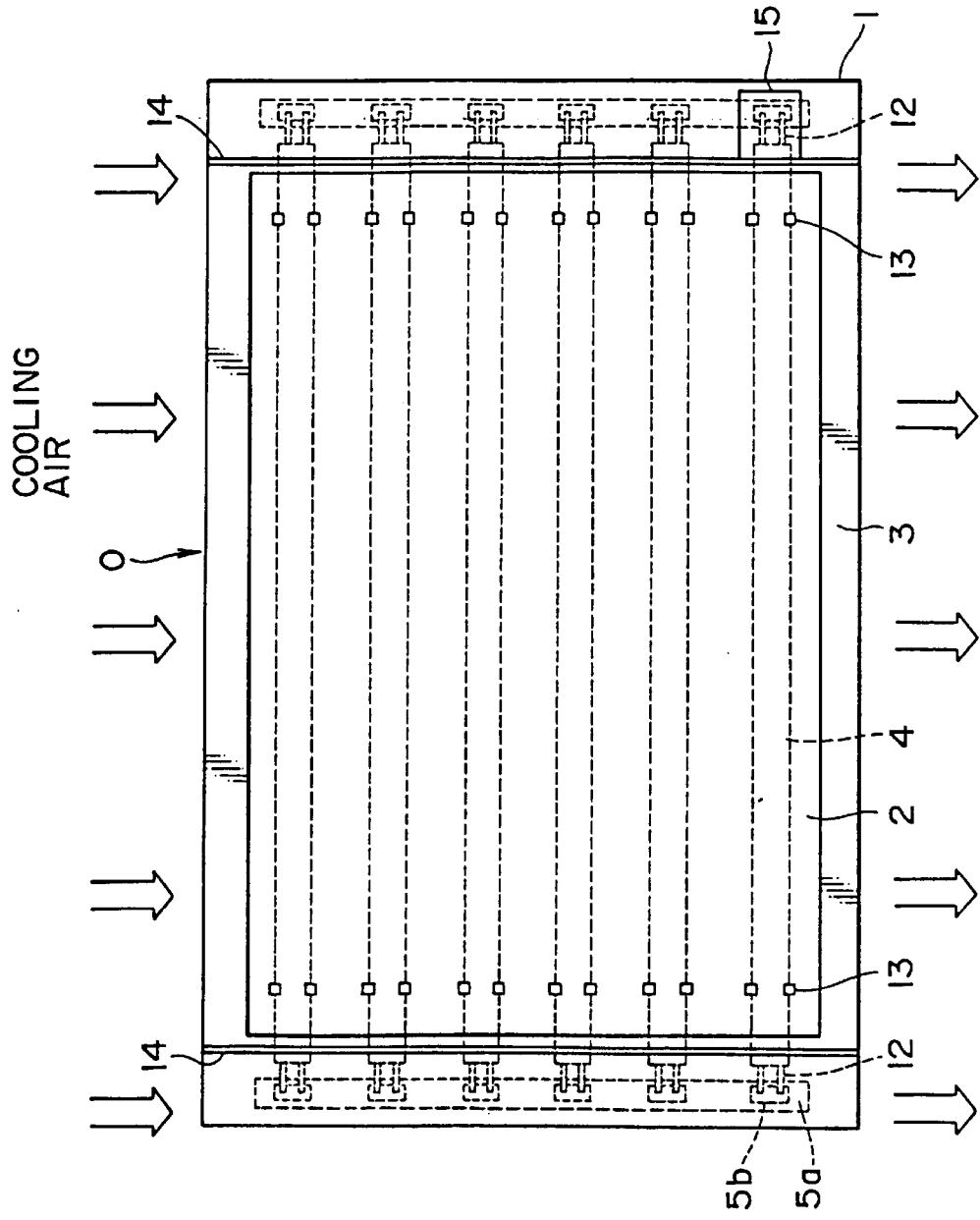
FIG. 2 is a plan view schematically showing the surface light source device shown in FIG. 1.

FIG. 2 is a-plan view-schematically showing the plane shape of the ,surface light source device 0 shown in FIG. 1. In the housing 1, the reflective plate 3 is mounted, on top of which a plurality of lamps 4 are arranged. The individual lamps 4 consist of longitudinal-shaped fluorescent tubes equipped with electrode portions 12 at both ends thereof respectively. Each lamp 4 is supported at both ends by a pair of holders 13. These lamps 4 are covered with the diffuser panel 2. In the housing 1, partition walls 14 are installed on both sides. The central portion enclosed with a pair of partition walls 14 constitutes the closed space (lamp house) 8 described above. The portions outside of each partition wall 14 belong to the open space. In this open space, there is arranged a connector circuit 5a which becomes a part of the electric circuit portion 5 (See FIG. 1). To this connector circuit 5a, a plurality of connectors 5b are installed, and are connected to the electrode portions 12 for each lamp 4. In the present embodiment, the electrode portions 12 for the lamps 4 are mounted with protective members 15 having heat conductivity and heat resistance. However, only one protective member 15 is exemplified. The heat generated in the electrode portion 12 is radiated outside the closed space through the protective member 15. For the protective member 15, there can be used a molded product from rubber material having heat resistance and heat conductivity.

Figure 3:
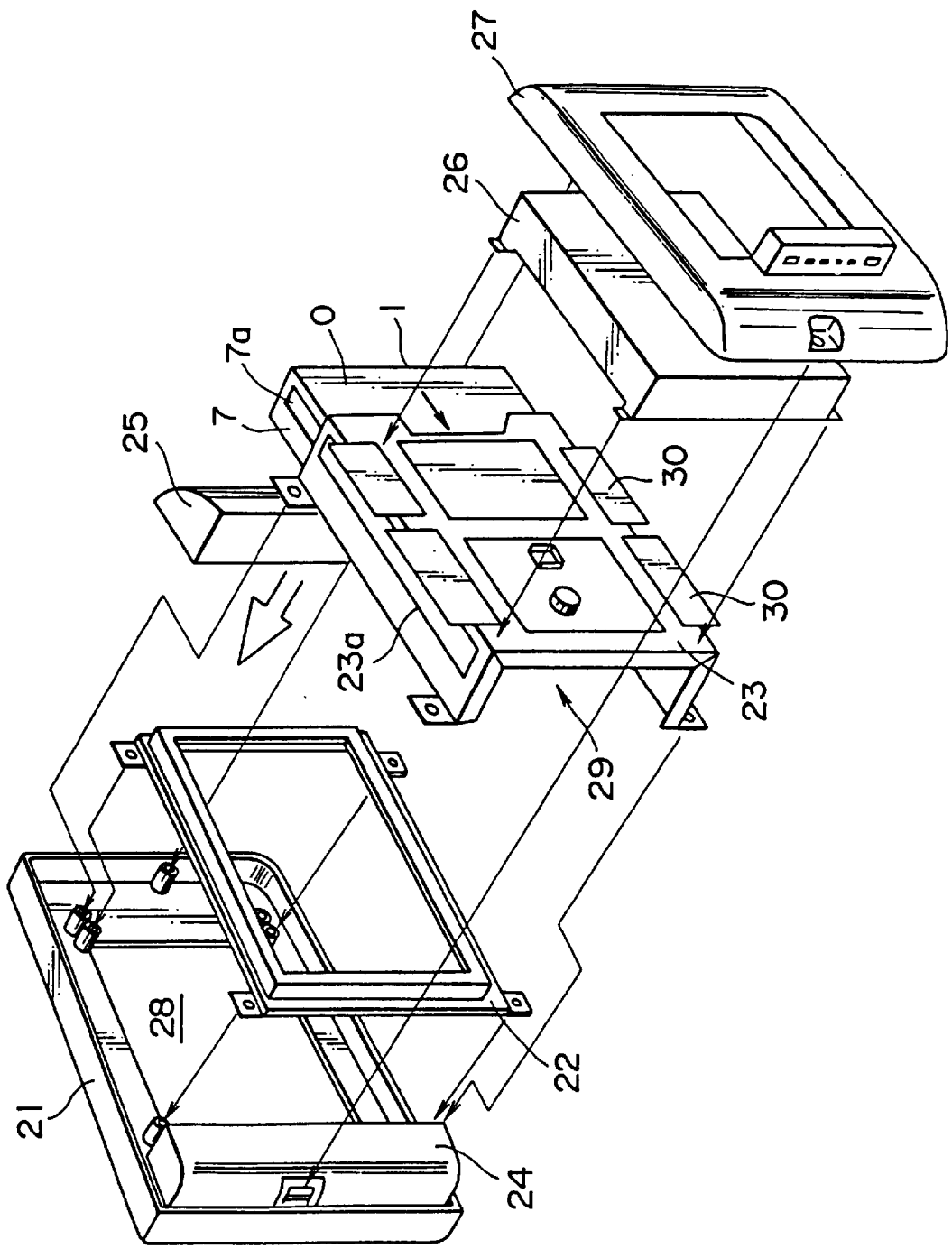
FIG. 3 is an exploded perspective view showing an example of a flat display set in which a surface light source device according to the present invention is installed as back-light.

FIG. 3 is an exploded perspective view showing an example of a flat display set in which the surface light source device 0 shown in FIGS. 1 and 2 is utilized as back-light. The flat display set is equipped with a frame 21, a display unit 22, a surface light source device (back-light unit) 0 and a chassis 23. It also has a pair of speakers 24 and 25, a shield cover 26 and a rear cover 27. The frame 21 is located in the front of the set, and the window portion 28 is provided. The display unit 22 has a flat shape, and is of a transmission type. It is installed to the frame 21 from behind, and matches to the window portion 28 to constitute a screen. The chassis 23 is located in the back of the set, and is engaged with the frame 21 with the display unit 22 interposed therebetween to form a flat containing space 29 on the back side of the display unit 22. The back-light unit is a surface light source device 0 previously assembled using a housing 1 having a flat shape, and can be detachably inserted into the containing space 29 described above to illuminate the transmissive display unit 22 from the back.

As described above, on the upper side portion 7 of the housing 1, an opening 7a is formed. In this respect, on the lower side portion 7 of the housing 1, an opening 7b corresponding thereto is formed though not shown. Further, when the housing 1 is mounted to the containing space 29 of the chassis 23, an opening 23a is formed on the upper side portion of the chassis 23 so as to match the opening 7a. On the lower side portion of the chassis 23, an opening is formed correspondingly to this opening 23a. Though not shown, an air-cooling fan is mounted on the upper side of the flat display set so that cooling air is forcibly fed into the interior of the surface light source device 0 through the openings 23a and 7a to perform effective air-cooling. In this respect, in the present embodiment, in order to facilitate the maintenance such as lamp replacement, there is adopted such structure that the surface light source device 0 is manufactured into a cassette so as to be detachably inserted into the chassis 23. However, the present invention is not restricted to this, but the surface light source device may be installed with the chassis 23 itself as the housing. In this respect, a circuit substrate 30 for driving the display unit 22 is mounted on the back side of the chassis 23.

Figure 4:
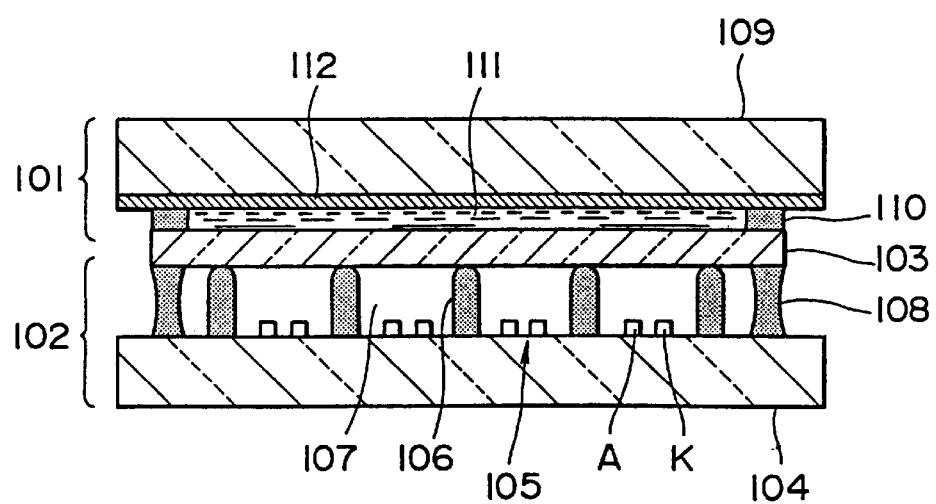
FIG. 4 is a sectional view showing an example of a transmissive display-panel installed in the flat display set shown in FIG. 3.

FIG. 4 is a sectional view schematically showing an example of a transmissive display panel installed in the display unit 12 of the flat display set shown in FIG. 3. This display panel is of a plasma addressed display type, and has flat panel structure consisting of a liquid crystal cell 101, a plasma cell 102 and a common intermediate substrate 103 interposed between the two. The intermediate substrate 103 consists of exceedingly thin sheet glass or the like, and is called micro-sheet. The plasma cell 102 is composed of a lower substrate 104 consisting of glass or the like joined to the intermediate substrate 103, and the air gap between the two is charged with ionizable gas. On the inner surface of the lower substrate 104, stripe-pattern discharge electrodes 105 are formed. Since they can be printed and baked on a flat glass substrate 104 by the screen printing method or the like, the discharge electrodes 105 are excellent in productivity and workability and also can be made fine. On the discharge electrodes 105, partition walls 106 are formed, and divide the air gap which has been charged with ionizable gas to constitute discharge channels 107. These partition walls 106 can be also printed and baked by the screen printing method, and their apexes are in contact with one surface side of the intermediate substrate 103. The stripe-pattern discharge electrodes 105 alternately function as either anode A or cathode K to cause plasma discharge between the two. In this respect, the intermediate substrate 103 and the lower substrate 104 are joined together through glass frit 108 or the like.

On the other hand, the liquid cell 101 is composed of the upper substrate 109 consisting of glass and the like. This upper substrate 109 is adhered to the other surface side of the intermediate substrate 103 through a predetermined gap by sealant 110 or the like, and the gap is charged and filled with liquid crystal 111. On the inner surface of the upper substrate 109, a signal electrode 112 consisting of transparent conductive film is formed. This signal electrode 112 is orthogonal to the stripe-pattern discharge electrode 105. At the intersection portion between the signal electrode 112 and the discharge channel 107, a matrix-shaped pixel is prescribed.

In a plasma addressed display panel having such structure, a line-shaped discharge channel 107, in which plasma discharge is performed, is switched in line sequence for scanning, and an image signal is applied to a column-shaped signal electrode 112 on the liquid crystal cell 101 side in synchronism with this scanning to thereby perform display driving. When plasma discharge occurs within the discharge channel 107, the interior has almost uniformly anode potential to select pixel for each line. In other words, the discharge channel 107 functions as a sampling switch. When an image signal is applied to each pixel while the plasma sampling switch is conducting, the sampling is performed and the transmission factor of pixels can be controlled. Even after the plasma sampling switch enters a nonconducting state, the image signal is held as it is within the pixel. If a plasma addressed display panel having such structure is back-lighted by a surface light source device according to the present invention, a clear image will be projected on the front.

As described above, according to the present invention, the closed space (lamp house) is formed by the diffuser panel and the reflective plate which have been installed in the housing, and lamps are housed within the closed space. On the other hand, the open space is formed between the reflective plate and the housing, and cooling air is forcibly fed here by an external air-cooling fan or the like to diffuse the heat generated from the lamps outward. Since no cooling air enters the closed space where the lamps are arranged, dust and dirt can be effectively prevented from adhering. Also, since the cooling air flows along the back surface of the reflective plate, it is possible to effectively remove the heat from the lamps.

What is claimed is:
1. A display device, comprising:
    a frame located at a front of said display device and being formed with a window portion;
    a display unit being a flat transmissive panel;
    a back-light unit being device having:
        a housing having a window portion located ahead, a base portion located behind and side portions forming a flat space by connecting together the two;
        a diffuser panel mounted to said window portion;
        a reflective plate supported by said side portions, for partitioning said flat space into a closed space ahead and an open space behind to be interposed therebetween;
        lamps housed in said closed space, and positioned right above said reflective plate and right under said diffuser panel to radiate light toward said diffuser panel;
        an electric circuit portion housed in said open space, for being electrically connected to said lamps to light them up; and
        heat-radiating portions formed in said side portions of said housing, including a number of openings for conductively connecting to said open space, for introducing cooling air supplied from outside into said open space to diffuse heat accumulated within said housing; and
    a chassis located behind the set for matching the frame to interpose the display unit therebetween.
2. A display device as defined in claim 1, wherein said transmissive panel used for said display unit is a plasma addressed display.

* * * * *